(12) United States Patent
Reynolds

(10) Patent No.: US 11,760,608 B2
(45) Date of Patent: Sep. 19, 2023

(54) WIND TURBINE BLADE REMOVAL DEVICE AND METHOD

(71) Applicant: Barnhart Crane and Rigging Co., Memphis, TN (US)

(72) Inventor: Kevin Reynolds, Memphis, TN (US)

(73) Assignee: Barnhart Crane and Rigging Co., Memphis, TN (US)

( * ) Notice: Subject to any disclaimer, the term of this patent is extended or adjusted under 35 U.S.C. 154(b) by 0 days.

(21) Appl. No.: 17/620,690

(22) PCT Filed: Jun. 18, 2020

(86) PCT No.: PCT/US2020/038533
§ 371 (c)(1),
(2) Date: Dec. 18, 2021

(87) PCT Pub. No.: WO2020/257522
PCT Pub. Date: Dec. 24, 2020

(65) Prior Publication Data
US 2022/0242701 A1    Aug. 4, 2022

Related U.S. Application Data

(60) Provisional application No. 62/862,748, filed on Jun. 18, 2019.

(51) Int. Cl.
*B66C 1/10* (2006.01)
*F03D 13/10* (2016.01)
*B66C 13/08* (2006.01)
*B66C 13/40* (2006.01)

(52) U.S. Cl.
CPC ............... *B66C 1/108* (2013.01); *B66C 13/08* (2013.01); *B66C 13/40* (2013.01); *F03D 13/10* (2016.05); *F05B 2230/61* (2013.01)

(58) Field of Classification Search
CPC ...... F05B 2230/61; F03D 13/10; B66C 13/08; B66C 13/40; B66C 1/108; B66C 1/10; B66C 1/16
See application file for complete search history.

(56) References Cited

U.S. PATENT DOCUMENTS

| | | |
|---|---|---|
| 5,205,544 A | 4/1993 | Kroeger |
| 2005/0019166 A1 | 1/2005 | Bervang |
| 2011/0221215 A1 | 9/2011 | Botwright |
| 2017/0050824 A1 | 2/2017 | Fenger |
| 2019/0063400 A1 | 2/2019 | Gomez |

FOREIGN PATENT DOCUMENTS

WO    2012062352 A1    5/2012

OTHER PUBLICATIONS

International Search Report and Written Opinion for Application No. PCT/US2020/038533 dated Aug. 28, 2020, 7 pages.

*Primary Examiner* — Moshe Wilensky
(74) *Attorney, Agent, or Firm* — Baker Donelson

(57) ABSTRACT

A system and method for removing or installing wind turbine blades, comprising a single spreader-type bar fitted with specialized end units with rotatable chain and/or cable for supporting the blade at two or more lift points. The inventive device allows for a single-crane lift of a wind turbine blade, with the ability to remotely control and fine tune the level and pitch of the blade during all portions of the lifting, lowering, installation and/or removal operations.

2 Claims, 7 Drawing Sheets

Rolling blocks allow for free rotation of blade in either direction as powered root end motor turns the blade Wind turbine blade

WIND TURBINE BLADE REMOVAL DEVICE AND METHOD

CROSS REFERENCE TO RELATED APPLICATIONS

The present invention claims priority to U.S. Provisional Patent Application No. 62/862,748, filed Jun. 18, 2019, which is incorporated herein by reference in its entirety.

BACKGROUND OF THE INVENTION

Field of the Invention

The invention relates primarily to systems and methods for lifting industrial wind turbine components. More specifically, the present invention is a device for controlling the lift and lowering operations of a wind turbine blade using a single crane.

Description of the Background

Wind turbines are gaining popularity as a means of renewable energy production in the United States and worldwide, and the installation of wind farms, or open areas where several wind turbines are installed, is also on the rise. Wind farms are typically sited in areas where relatively strong winds are measured on a consistent basis. Wind turbines work by converting the kinetic energy generated when the wind rotates their blades into electrical energy. In order to work, wind turbines are in motion as much as possible and can be exposed to high, potentially damaging winds. Thus, one or more components of a wind turbine must be removed, repaired and/or replaced from time to time, either due to wind damage, routine wear and tear, mechanical failure, or for scheduled warranty or upgrade work.

Wind turbines are generally constructed with three blades, arranged in even spacing around a hub, and connected thereto with a pitch bearing or similar device. When fully installed, the blades are attached in a fixed position with respect to the hub, and the blade and hub assembly is referred to as the rotor. The rotor is mounted at the top of a tall tower to capture the wind most effectively. The blades and hub rotate around the main axis of the hub propelled by the blades' interaction with the surrounding wind, and the resultant kinetic energy is converted to electric energy and transmitted down the tower and onwards to the power grid.

Wind turbine blades can weigh 11,500 lb or more, and be 160 feet long or longer, while the tower is often more than 300 feet tall. Many types of service to a wind turbine blade, and of course replacement of a blade, requires the blade to be disconnected from the hub and lowered from the top of the tower to the ground level for inspection, repair, or most commonly, transport off site. Wind turbine blades are most commonly transported on a flatbed trailer while being stabilized within a shipping frame. Shipments are preferably under 8'6" wide, and as low as possible to the ground to avoid highway interference. Modern blades generally have a curved shape and are widest at the root end, with an additional fin or projection on the trailing edge to capture the wind, making them non-symmetrical along at least a portion of their length when viewed upward along the primary axis. Blades are typically required to be transported with the trailing edge pointed up to comply with state highway and other relevant regulations. However the blade is installed with the widest portion in the plane of rotation of the hub, a roughly 90 degree rotation from the transport position.

Therefore, one critical aspect of removing a wind turbine blade is rotating it to fit into a shipping frame. This usually requires that the blade be placed on the ground, and then re-rigged and lifted again to rotate it into position to be placed into the shipping frame. Such double handling of blades has a high risk of causing damage to the blade. Moreover, this operation should only be performed during a low wind period, because the positioning of a blade in this upright position causes a high side-load in the presence of elevated winds, which is dangerous and which also raises the risk of damage to the blade and surrounding equipment. The prevalence of high winds on a wind farm, the location of which is chosen for its above-average wind speeds, is high, and so limited windows of opportunity to re-rig and rotate the blade could make this process several days long.

The process of removing the blade from the hub, stabilizing it mid-air, and lowering it to the ground has its own engineering challenges. All of these operations, including the rotation of a blade to fit it into a shipping frame, are typically done using cranes. There are two basic prior art methods of removing a wind turbine blade.

In one method, a single, large crane is used to remove the entire rotor, including the hub and all three blades, and place it on the ground onto a prepared support frame, which will require each of the individual blades to be removed, as needed, and serviced. Due to the potential weight of the full rotor assembly, a very large crane is needed for an operation of this type, at considerable cost. Cranes of this size also require a large crane pad to rest on, and require lots of time and manpower to mobilize. It also requires a significant amount of time and manpower to prepare the support for the full rotor assembly to rest on once grounded, and a large area at the base of the turbine on which to place the rotor, which can be 100 yards in diameter.

In the second prior art method, two average-sized cranes are operated in tandem to capture the blade at the top of the tower and move in coordinated fashion to lower it to the ground. This is a high-risk operation in that the movement of the cranes must be highly coordinated in order to balance the blade in mid-air upon removal from the hub. Usually, one crane will support the distal, or tip, end of the blade and the other will support the root end of the blade, each with a specially designed sling that loops underneath the blade at a specific point. Because the tip end of the blade is relatively narrow in most modern blade designs, its manufacturers add reinforcement to a specific section of the blade, a lifting area, where the lifting device must be positioned in order to avoid damage to the blade. The distance between the root end and the approved lifting area at the tip end of the blade can vary widely from manufacturer to manufacturer. Adjustments to both crane positions must then be made before the blade is detached from the hub, to ensure that the blade will be adequately supported when freed from the hub. This is often a delicate operation in that the blade will often not be level, or parallel to the ground, when removed from the hub. Removal of the blade requires the rotor to be "locked out" to eliminate rotation of the rotor while the blade removal operation is in process. However the "lock out" angle of a rotor can be different from turbine to turbine, and is often several degrees off from level. Not only can an unbalanced support of the blade cause a potentially dangerous situation mid-air when the blade is detached from the hub, but it can also cause unnecessary additional damage to the bolts used to attach the blade to the pitch bearing. The studs in the bearing must be "freed up" when removing the blades, which requires additional delicate adjustments to the pitch of the blade relative to the ground.

The use of two, albeit smaller, cranes also has a relatively high cost, both in terms of equipment and manpower to mobilize and operate both cranes simultaneously. Two cranes also require more pad area than a single crane to perform this operation.

Of course, the prior art methods described above are also used in reverse when installing or re-installing a wind turbine blade after maintenance. With respect to the two-crane method in particular, proper blade pitch (relative to the ground) is necessary when getting the blade studs clocked properly to line up with the inner race of the pitch bearing on installation. This is also a delicate operation when done as a coordinate effort between two cranes.

Thus, it would be advantageous to have a system and method for removal of a wind turbine blade that avoids these and other drawbacks of the prior art.

SUMMARY OF THE INVENTION

Accordingly, the present invention is a system and method for removing or installing wind turbine blades, comprising a single spreader-type bar fitted with specialized end units with rotatable chains or cables for supporting the blade at two or more lift points. The inventive "blade bar" allows for a single-crane lift of a wind turbine blade, with the ability to remotely control and fine tune the level and pitch of the blade during all portions of the lifting, lowering, installation and/or removal operations.

The foregoing objects, features and attendant benefits of this invention will, in part, be pointed out with particularity and will become more readily appreciated as the same become better understood by reference to the following detailed description of a preferred embodiment and certain modifications thereof when taken in conjunction with the accompanying drawings.

DETAILED DESCRIPTION OF THE PREFERRED EMBODIMENTS

The present invention is a device, a system incorporating the device, and a method for using the inventive device and system to remove or install a wind turbine blade. As can be seen, however, the inventive device can be used for the installation or removal of similar elongated devices for which lifting and leveling is useful. Possible alternative applications include installation, removal, or other lift operations for loads such as a slanted conveyor or a horizontal vessel.

Generally, the inventive device comprises a boom of adjustable length, with several novel features that enable it to be lifted by a single crane and to securely, safely and efficiently capture a wind turbine blade and support it as the single crane lowers it to the ground and/or to a shipping frame, or alternatively raises it to the top of a wind turbine for attachment to the inner race of the pitch bearing attached to the hub. The inventive blade bar 1 can be lifted by a single, mid-sized crane, such as a lattice boom truck crane, or a hydraulic crane—a large crane capable of supporting the entire rotor is not required—thereby eliminating the drawbacks of the two-crane lifting method for individual blades that are demonstrated in the prior art.

Figure 1:
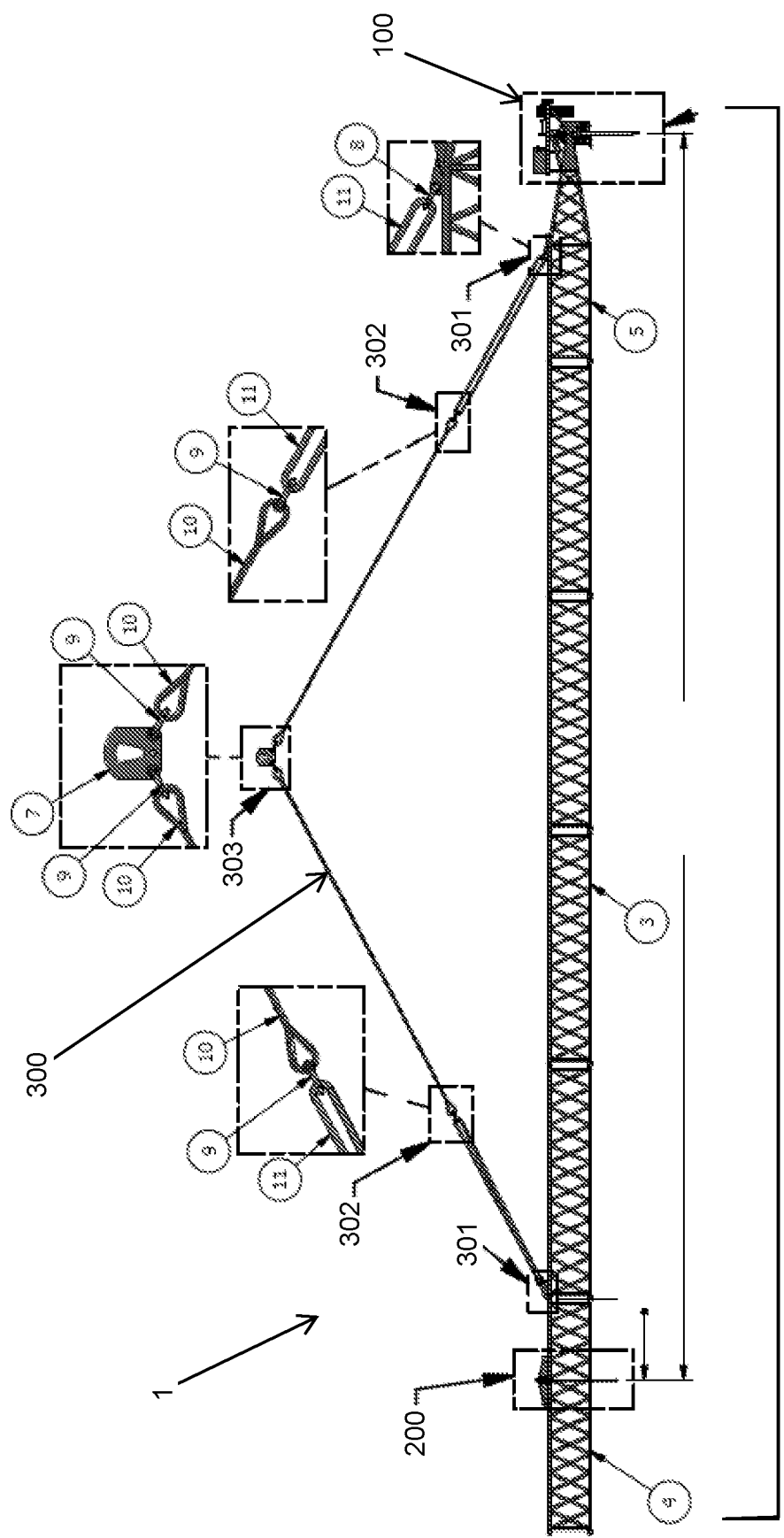
FIG. 1 is a schematic diagram of the inventive blade bar according to embodiments of the invention.

As shown in FIG. 1, blade bar 1 comprises a custom spreader bar 2, which may be comprised of one or more custom-sized segments, each having a lattice structure as shown to provide a low self-weight of the blade bar 1. Three primary segments are identified in FIG. 1: a 20 ft. straight section 3, a 20 ft heavy duty straight section 4, and a root end section 5, designed to be positioned adjacent to the root end of the blade being removed and/or installed. In preferred embodiments, spreader bar 2 may be comprised of one or more segments which are provided in 5 ft increments, to provide a custom length. Also in preferred embodiments, each individual segment of rigging is adjustable in 1" or lower increments, to provide a custom length spreader bar 2. Specifically, in preferred embodiments, the tip end unit clamps to the top of the chord of its designated boom section to provide infinite adjustment of the distance between lift points, as will be described. The tip end unit is preferably affixed to the top of spreader 2 by a U-bolt 205 (see FIGS. 2 and 3) on either side thereof. In some embodiments, U-bolts 205 have two or more attachment points at the point of attachment to the top of spreader 2, which are offset from one another by a specified distance, such as 6", such that the location of the tip end unit along the length of spreader 2 is infinitely adjustable, whereby an alternate set of attachment points can be used in the case that the primary attachment point interferes with a portion of the lattice making up spreader 2.

As will be described, the inventive system disclosed herein will include a processor running software programmed to calculate the optimum length of the spreader bar 1 for each application, based on application-specific inputs provided by the operator, or based on a library of standard application conditions. The system will present the operator with an optimum length of spreader 2, and optionally the number and length of sections, and their relative positions, which would ideally be used to create the spreader. The operator can then collect sections having the system-determined specifications and connect them in the specified order to produce the required spreader 2.

Also shown in FIG. 1 is the custom rigging 300 comprising a remotely controlled tilting device to control the tilt or angle of the spreader 2 relative to the ground. In the embodiment shown in FIG. 1, rigging 300 includes two end rigging couplings 301, one each attached adjacent the root and tip ends of the spreader 2, as shown, two adjustable couplings 302 along the main lengths of each arm of the rigging, and a bear paw-type linkage 7 joining both arms of the rigging at a lift point for further connection to the crane (not shown). In the illustrated embodiment, adjustable couplings 302 can comprise a shackle (such as 25*t* bolt type) 9, a sling 10, and a sling-synthetic round 11. End rigging couplings 301 may comprise a shackle (such as 17*t* bolt type) 8 and sling 11.

Figure 7:
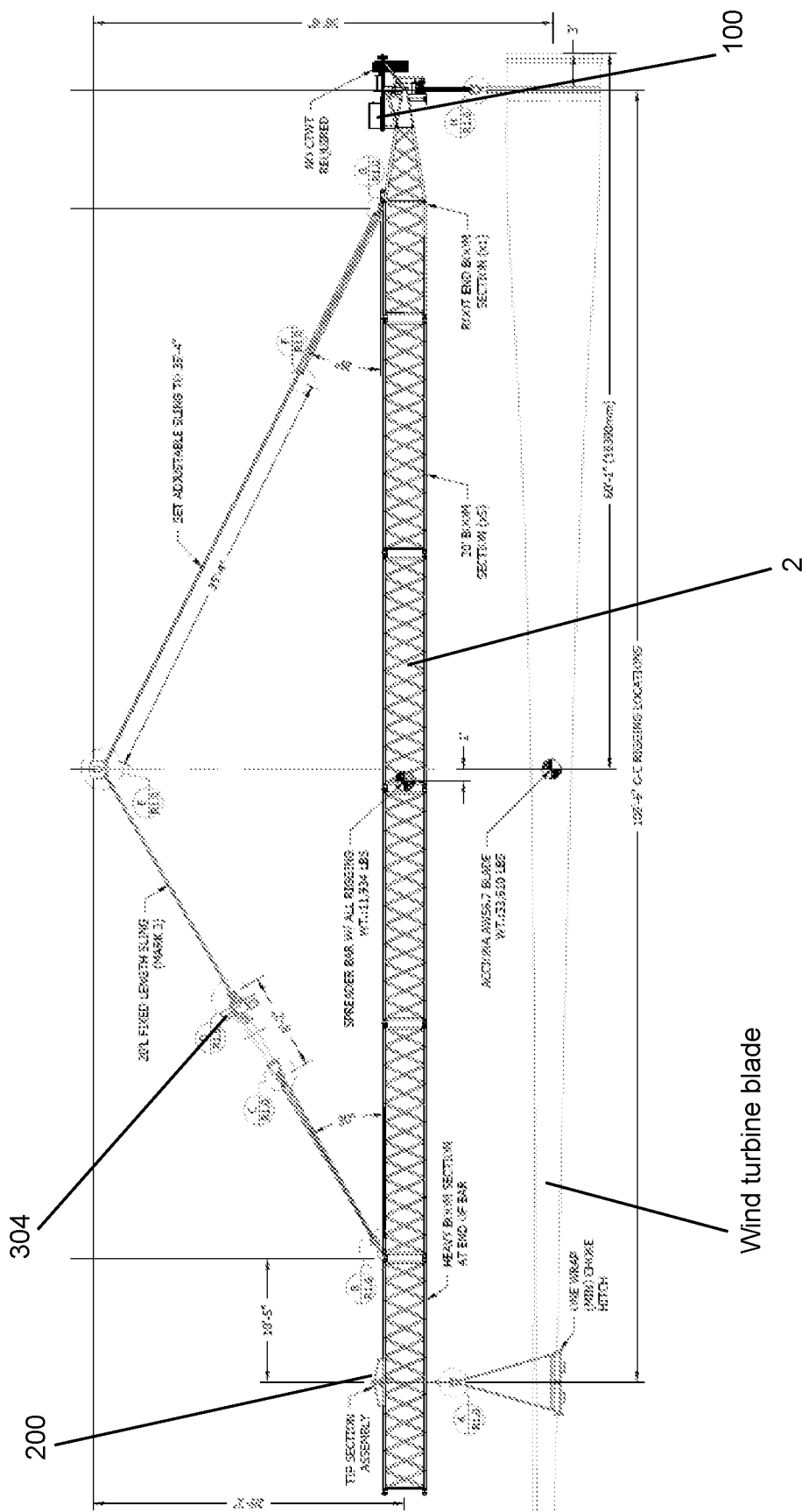
FIG. 7 is a side view of the blade bar 2 as rigged for attachment to a crane and supporting a wind turbine blade at two lift points.

In other preferred embodiments, as shown in FIG. 7, one or both arms of the rigging is fitted with a length adjustment mechanism 304, such as an air hoist or the like, which is capable of being controlled remotely, e.g. by the crane operator in the cab. The addition of an air hoist on one or both arms of the rigging 300 allows the operator to adjust the tilt angle of spreader 2 by adjusting the length of one or both arms. The ability of the operator to adjust tilt angle of the spreader 2 will in turn, by virtue of the unique design of the blade bar according to the present invention, allow the operator to adjust the tilt angle of the blade in real time, as will be shown. Ability to adjust the tilt angle of the blade in real time is a useful and novel improvement provided by the instant invention over the prior art, whereas micro adjustments to the tilt angle of the blade during installation or removal can avoid damage to the blade, to the bolts affixing it to the hub, and increase safety of the operation.

Figure 2:
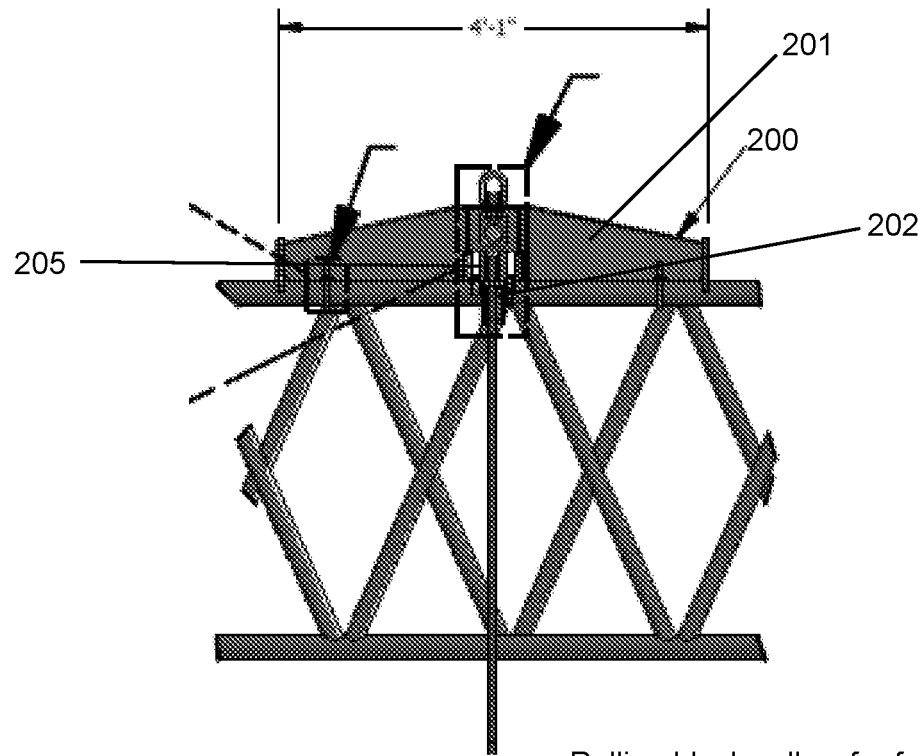
FIG. 2 is a side view of a tip end unit situated on said blade bar according to embodiments of the invention.

The blade bar 1 further comprises a root end unit 100 and a tip end unit 200. Additional detail of the tip end unit 200 is shown in FIGS. 2 and 3, side and end view of the tip end unit 200, respectively.

Figure 3:
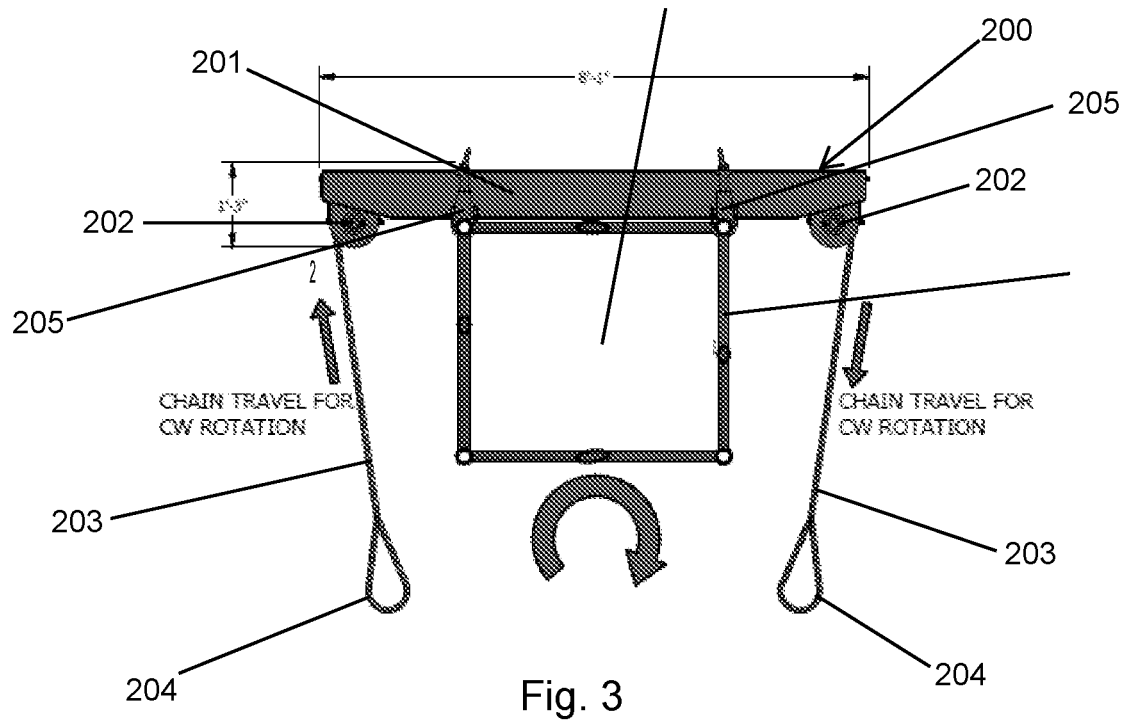
FIG. 3 is an end view of a tip end unit situated on said blade bar according to embodiments of the invention.
Figure 4:
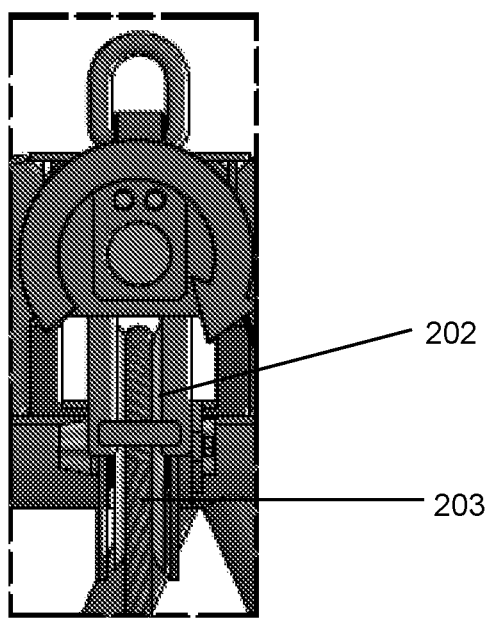
FIG. 4 is a detail view of the roller and cable, viewed from the side, of said tip end unit according to embodiments of the invention.
Figure 9:
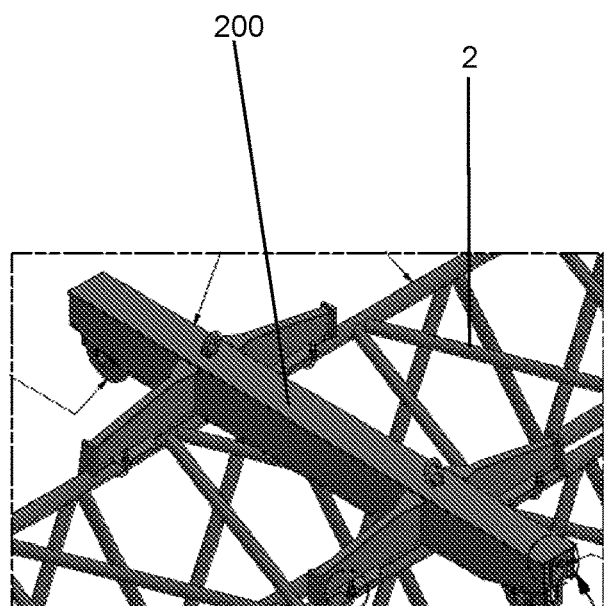
FIG. 9 is a top perspective schematic view of the tip end unit.

With reference to FIG. 3 in particular, as viewed along the main axis of blade bar 1, tip end unit 200 comprises an elongate housing 201 which mounts to the top of spreader 2 and is slightly wider than spreader 2 such that it extends beyond the top edge of either side of spreader 2. FIG. 9 is a top perspective view of tip end unit 200 illustrating its shape and attachment to blade bar 2. Within the portion of housing 201 that extends beyond the edge of spreader 2, on either side, is a pulley-type roller or sheave 202 (shown in greater detail in FIG. 4). Sheaves 202 are aligned such that a chain or cable 203 can be fed through one sheaves 202, across the top of spreader 2 from side to side, through the body of housing 201, and through the other sheave 202. A cable 203 arranged in such a fashion will hang down on either side of spreader 2 as shown in FIG. 3. Cable 203 may travel in either direction through sheaves 202; the arrows in FIG. 3 illustrate the direction of cable travel in the clockwise direction as an example. Cable 203 has attachment points 204 at either end thereof, which are designed to accept the end of a sling or tagline (not shown in FIG. 3) designed to support a wind turbine blade, without damaging it, by wrapping around and underneath the base thereof. When assembled, the cable 203 and the sling form a continuous loop which wraps across the top of spreader 2 through the housing of end unit 200 and around to form a bottom support which can support a wind turbine blade at one lift location thereof. As can be seen, movement of the cable 203 in either direction through sheaves 202 will rotate the cable 203, sling and any supported wind turbine blade in either a clockwise our counter-clockwise direction, as viewed along the main axis of spreader 2, depending on the direction of movement of cable 203. This movement is referred to as "pitching".

Figure 5:
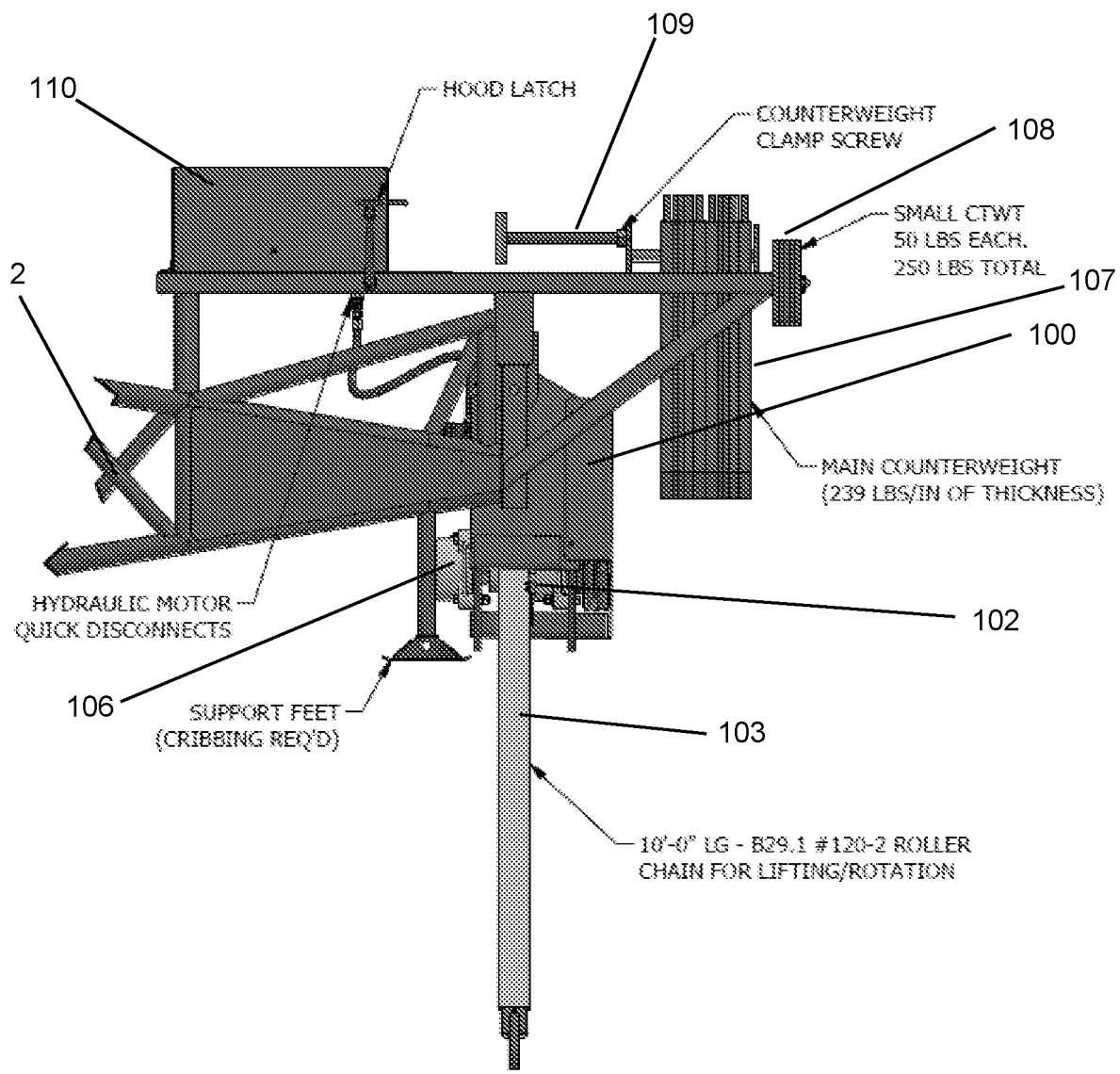
FIG. 5 is a side view of a root end unit and counterweight system situated on said blade bar according to embodiments of the invention.
Figure 6:
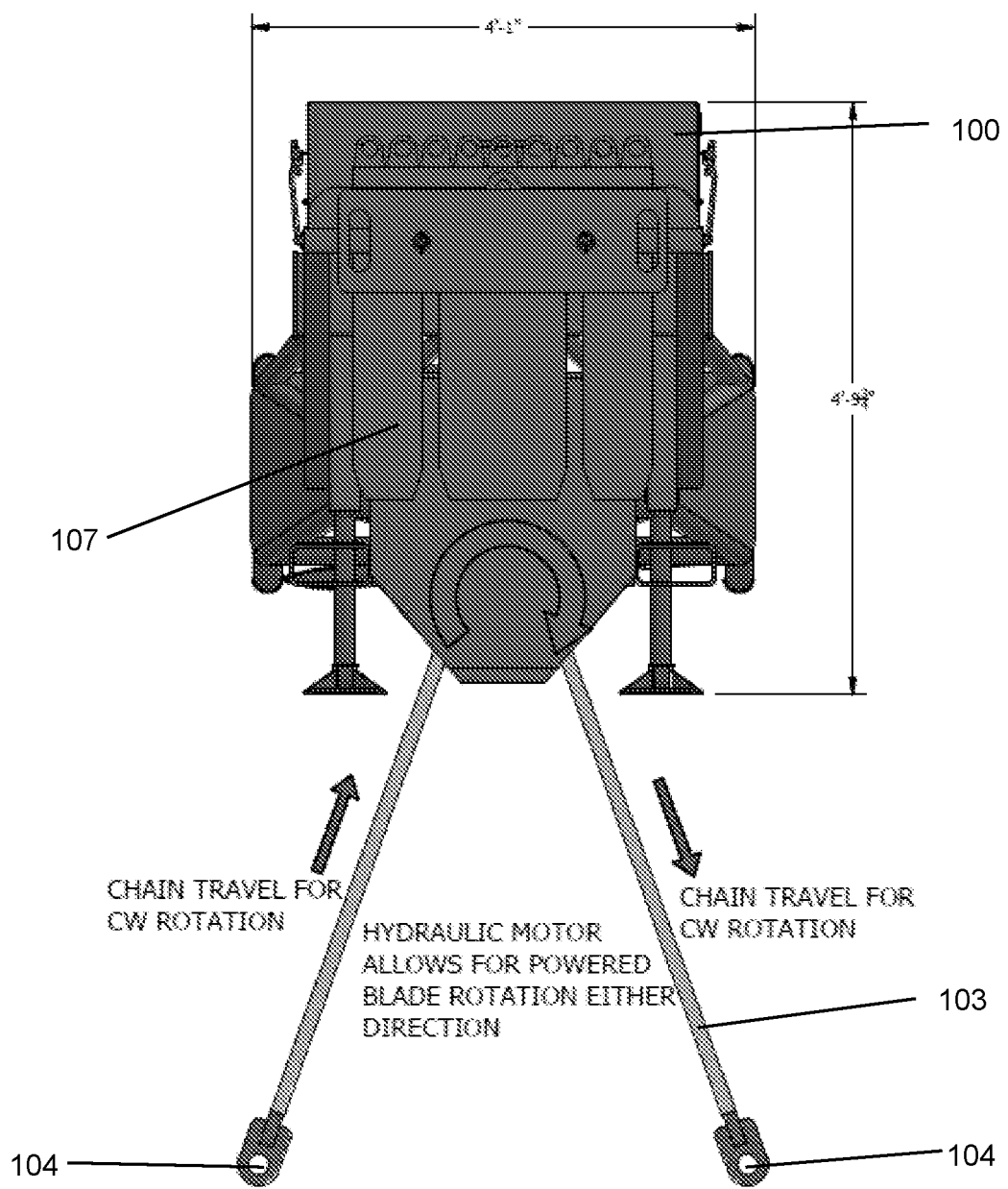
FIG. 6 is an end view of a root end unit and counterweight system situated on said blade bar according to embodiments of the invention.

Root end unit 100 also includes a chain and roller system, as shown in FIGS. 5-6, but also includes a hydraulic motor 106 operatively connected to the root end unit roller or sprocket 102 for active control of movement of the chain and a sling connected to both ends of the chain, and consequently of the pitch of a wind turbine blade supported by the inventive blade bar. With reference to FIG. 5, in preferred embodiments, root end unit 100 is affixed to the front face of the root end of spreader 2, such that components on the underside of root end unit 100 are exposed directly to the area above a wind turbine blade, when supported by blade bar 1. In this configuration, as shown in FIG. 6, root end unit 100 can use a system comprising only 1 pulley-style roller or sprocket 102 through which chain 103 is fed. Sprocket 102 is operatively connected to a hydraulic motor 106 which controls the rotational direction and speed of sprocket 102, and thereby the movement of chain 103, any attached sling, and the pitch of any supported wind turbine blade. Other than the use of a single sprocket 102 in this embodiment, the configuration of chain and sling is similar to that described with respect to end unit 200. At the ends of the roller chain 103 there are custom weldments 104 that adapt the roller chain to a shackle, which then connects to a sling for supporting the blade.

In preferred embodiments, motor 106 is able to be remotely controlled in real time by an operator using a wireless remote. Therefore, the inventive device preferably comprises means for wireless transmission and reception of control signals to and from motor 106. The wireless transmission means, as well as a power source for motor 106, may be contained within the housing of root end unit 100, or within another housing 110 affixed to the top side of spreader 2, as shown in FIG. 5.

Additional configurations of root 100 and tip 200 end units are possible, comprising one, two or more rollers, one or more chains per unit and one or more coordinated or independently controlled motors. Importantly, however, the placement of root and tip end units on an assembled blade bar should enable easy connection with the two or more lift points on the wind turbine blade situated below.

An additional feature of root end unit 100 is best shown in FIG. 5. A counterweight mechanism 107 is situated on or near root end unit. FIG. 5 also shows an optional secondary counterweight 108, for fine tuning of the total weight. Counterweights 107, 108 can be secured to root end unit 100 and/or to spreader 2 by one or more clamps (an exemplary one is indicated with reference character 109) or other means as is known in the art. The weights themselves can be provided in multiple increments to suit the needs of the application, and as determined by the system's software based on operator inputs about the job specifications. The weights can be of the type and material known in the art. The inventive device's use of an adjustable counterweight advantageously allows the blade bar 1 to hang level while in an unloaded state, and while connecting and disconnecting the rigging to the blade, based on a predetermined total counterweight weight which is determined by the operator, or in preferred embodiments, by the inventive system based on operator inputs.

Also disclosed is a method for using the inventive blade bar 1 to install or remove a wind turbine blade. In preferred embodiments, the inventive device further comprises a system that provides critical parameters for the operator to use in assembly of the blade bar 1 as a first step to the method of using same. Thus, in preferred embodiments, the system includes software, and optionally a processor running the software, along with input unit(s) and graphical user interface unit(s). The software receives inputs from the operator regarding the target turbine blade, such as one or more selected from the group comprising: length of the blade, weight of the blade, circumference of one or more portions of the blade, distance of one or more lift points from the root end of the blade, height of the tower, lock-out angle of the rotor, and the like. Using these inputs, the system will calculate the ideal length of spreader 2, optionally including the segments needed to achieve that length, and the order they should be placed in, as well as micro-adjustments to each segment to include the optimal spreader length to the inch. The system will also calculate the optimal counterweight, optionally including the number of each type of counterweight needed to produce the primary and secondary counterweights, as needed.

In certain embodiments, the system can include an accessible database of "lift plans" which include optimal values or ranges for the above parameters based on standard lift conditions, or standard-sized blades. The operator, when preparing for a lift using standard parameters, or the same conditions as a prior lift that has been saved in the database, can access these values and use them in assembling the blade bar 1.

In other embodiments, the operator can manually determine the parameters needed to assemble the blade bar.

Assembly is completed with the attachment of rigging 300 to the top of blade bar 1 and a sling to the attachment points 204 of the cable 203 in tip end unit 200.

According to the inventive method, in a method for removing a wind turbine blade, the blade bar so configured is rigged to a single crane on site and lifted to the height of the blade in question, which has been locked out in a position approximately level or parallel to the ground. The sling attached to tip end unit 200 is then looped around the tip end of the blade by maneuvering of the single crane to which the blade bar 1 is rigged. In certain embodiments, the blade's manufacturer may require or recommend that a support is used to lift the tip end of the blade. Supports of this type known in the art are "U" or taco shaped supports, including supports commonly known as a "surf board". These types of supports can be accommodated using the present invention by, e.g., installing them at ground level inside the sling under the tip end unit 200, or installing them at height using a manbasket and crane.

Figure 8:
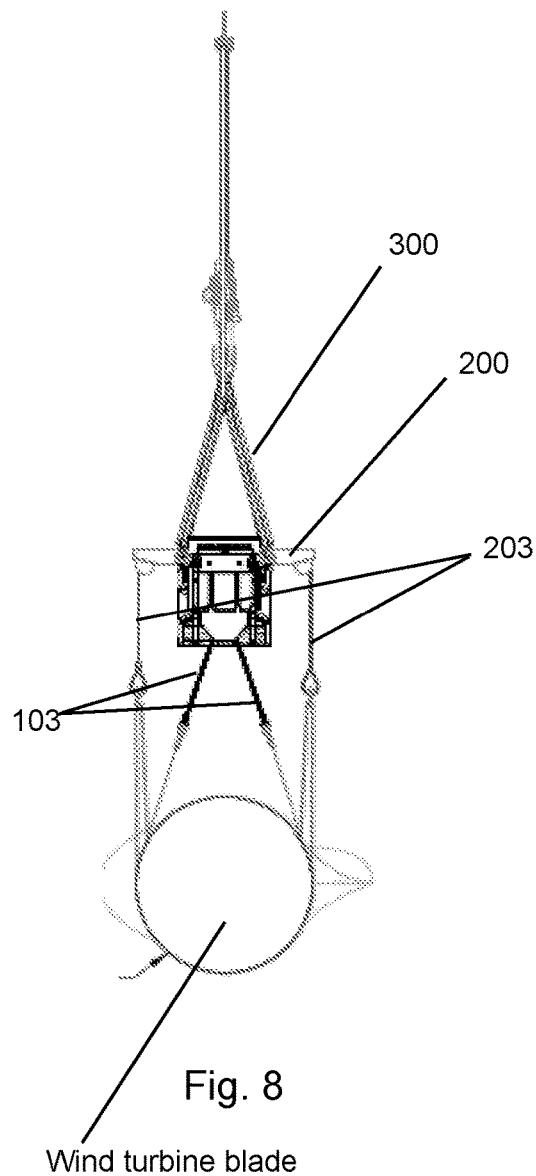
FIG. 8 is an end view, from the root end, of the blade bar 2 as rigged for attachment to a crane and supporting a wind turbine blade.

Instead of using a second crane to support the root end of the blade, advantageously in the present invention, the blade bar is positioned over and in line with the blade and a sling or strap is attached to chain 103 of the root end unit 100. Side and end views of the blade bar fully assembled and supporting a wind turbine blade are shown in FIGS. 7 and 8, respectively. At this stage, the air hoist on the blade bar's rigging 300 is activated to tilt blade bar 1 as needed to align it with the tilt of the blade, under the assumption that the lock out position of the blade is not perfectly level with the ground. This feature of the present invention is especially advantageous, as it allows the operator to properly line up the blade, and the studs extending out from the face of the root edge of the blade, with the inner race of the pitch bearing or other attachment mechanism by which the blade is secured to the hub. It is often necessary to make fine-tune adjustments to the level of the blade during removal, to "free up" the studs from the pitch bearing and allow them to pass out of the bearing without scraping, bending or other friction related damage that might otherwise result during an un-aligned removal. It also prevents the uncontrolled movement of the blade as the studs come out of the bearing. As in certain prior art methods, if the blade and studs go up and down too quickly, they can damage the fiberglass spinner. These advantages are equally great when the present invention is used in the installation, versus removal, of wind turbine blades. In these operations, it is necessary to get the blade studs clocked properly to line up with the inner race of the pitch bearing so that the studs can slide smoothly into the bearing without damage. All of the above can result in damage, breakage, or additional wear and tear on the blade and bearing, thus reducing the lifespan of these components. The inventive device provides a far enhanced ability to fine tune the level of the blade than do prior art methods involving two cranes and two crane operators attempting to work in tandem to control the level of the blade supported by two separate cranes. In preferred embodiments, the level is controlled by an air hoist, built into the rigging as previously described, which can be controlled remotely from inside the crane cab, from the ground, or from the top of the wind turbine as desired.

Pitch of the blade can also be adjusted to assist with the blade removal, or alternatively blade installation, operation. As with leveling, ability to fine tune the pitch of the blade also allows the operator to "free up" the studs in the bearing when removing the blades. Controlling pitch is equally important when installing a blade, to allow the blade studs to be clocked properly to line up with the inner race of the pitch bearing. Thus, another major advantage of the present invention is the ability to remotely fine tune the pitch of the blade with a single controller, whereas prior art methods using two cranes don't allow for pitch control. As described above, pitch is controlled by operation of the hydraulic motor 106 operatively connected to the root end unit sprocket 102, which turns the chain 103 and any sling, tagline or other attachment supporting the blade. In preferred embodiments of the invention, pitch is controlled by a remote via a wireless transmitter operatively connected to the motor 106.

Another advantage of the present invention's ability to remotely control blade pitch can be seen in the process of lifting or raising the blade to the top of the turbine tower or back to the ground, given the job requirements. Blades are normally shipped with the thin trailing edge pointed in an upward direction to be narrow enough for shipping. Pitching the blade from this position to an orientation such that the cross section is flat, for lifting or lowering the blade, provides for much less wind load on the blade. Lateral load from wind could be dangerous or potentially harmful to equipment because the crane's capacity is greatly reduced with large wind sail areas. Being able to lift from the shipping frame, pitch the blade, and then install the blade in one operation is very efficient, as is the reverse of this operation, whereby the operator can remove the blade from the hub, pitch it for lowering, and then fine-tune the pitch to properly fit it into the shipping frame.

For a blade removal operation, the operator can thereby lift the inventive blade bar to the level of the locked out blade, secure the blade bar 1 to the blade at two (or more as needed) lift points, control the level and tilt of the blade bar and blade during the process of securing the blade to the blade bar and detaching the blade from the hub, and further control pitch and level actively and with a single set of controls during the process of lowering the blade to the ground, allowing the operator to alter the pitch of the blade to reduce wind resistance while the blade is lowered and then again as needed to fit the blade into the shipping frame without double handling.

For a blade installation operation, the operator can actively control the pitch and level of the blade as it is removed from the shipping frame and lifted to the needed height. The operator can further control the level and the pitch of the blade as it is installed on the hub, to prevent damage to the bolts and components of the hub, all with a single crane and set of controls.

Some types of wind turbine blades are designed to be removed in conjunction with the bearing that attaches them to the hub, instead of being detached from the bearing prior to removal. Of course, the inventive device can be utilized for blades of this design as well, using the same method of attachment of the components to the blade bar 2.

As one additional advantage, all components of the inventive system are capable of breaking down into segments that are small enough, combined, to ship on a legal truckload.

In sum, the system provides a means for a wind turbine blade removal and installation device that is capable of being operated by a single crane. The inventive device and method also allows for more fine tuned control of pitch and level of the blade, without double handling, during the entire installation and/or removal operation to reduce potential damage to the blade during handling and to the blade and hub during installation and/or removal. The way in which the inventive system avoids double handling of the blade and allows quicker, single-control maneuvering of the blade can increase efficiency and reduce job time, saving cost.

While the device disclosed herein is particularly useful for use in wind turbine blade removal and installation, it is within the scope of the invention disclosed herein to adapt the device to use in other fields.

This application is therefore intended to cover any variations, uses, or adaptations of the invention using its general principles. Further, this application is intended to cover such departures from the present disclosure as come within known or customary practice in the art to which this invention pertains.

STATEMENT OF INDUSTRIAL APPLICABILITY

Wind turbine blades have a finite useful life and need to be repaired or replaced during the life of the turbine. The inventive device provides an economical, faster and safer means for installation or removal of a wind turbine blade, using a single crane that can actively control pitch and level of the blade during the entire operation, including lifting or lowering from the ground to the top of the wind turbine tower, which lowers equipment cost and makes it easier and faster to adjust pitch and level in real time. This ability to quickly adjust pitch and level with a single set of controls makes the job faster and safer than performing the same job with two coordinating cranes, as is done in the prior art.

I claim:

1. A method for removing a wind turbine blade from a wind turbine hub, the method comprising:
   providing a device comprising:
      a spreader bar having a root end and a tip end;
      a root end unit comprising at least one root end roller and a root end chain configured to pass through said root end roller with its free ends disposed beneath said bar;
      a tip end unit comprising at least one tip end roller and a tip end cable configured to pass through said root end roller with its free ends disposed beneath said bar;
      a counterweight mechanism; and
      rigging for attaching a top portion of said bar to a crane at at least two points along said top portion of said bar, said rigging comprising at least one air hoist configured to control a level of said bar;
      wherein at least one of said one or more root end rollers or said one or more tip end rollers is operatively connected to a motor for controlling a rotational speed and direction of said at least one roller, said motor being configured to receive control signals from a remote control device;
   securing the two ends of a first lift strap to the free ends of said tip end cable;
   securing said bar to a single crane using said rigging;
   lifting said bar with a single crane to a height just above said wind turbine blade;
   maneuvering said bar so that said lift strap secured to said tip end cable rests underneath a first lift point on said wind turbine blade;
   securing a second lift strap around a second lift point on said wind turbine blade and securing the two ends of said second lift strap to the free ends of said root end chain;
   disconnecting a root end of said wind turbine blade from said wind turbine hub; and
   lowering said wind turbine blade to the ground;
   wherein a pitch and level of said wind turbine blade are controlled throughout the process by a single set of controls operatively connected to said motor and said rigging.

2. A method for installing a wind turbine blade onto a wind turbine hub, the method comprising:
   providing a device comprising:
      a spreader bar having a root end and a tip end;
      a root end unit comprising at least one root end roller and a root end chain configured to pass through said root end roller with its free ends disposed beneath said bar;
      a tip end unit comprising at least one tip end roller and a tip end cable configured to pass through said root end roller with its free ends disposed beneath said bar;
      a counterweight mechanism; and
      rigging for attaching a top portion of said bar to a crane at at least two points along said top portion of said bar, said rigging comprising at least one air hoist configured to control a level of said bar;
   wherein at least one of said one or more root end rollers or said one or more tip end rollers is operatively connected to a motor for controlling a rotational speed and direction of said at least one roller, said motor being configured to receive control signals from a remote control device
   securing said bar to a single crane using said rigging;
   securing a first lift strap around a first lift point on said wind turbine blade and securing the two ends of said first lift strap to the free ends of said tip end cable;
   securing a second lift strap around a second lift point on said wind turbine blade and securing the two ends of said second lift strap to the free ends of said root end chain;
   lifting said bar and supported wind turbine blade to the height of a connection point on said wind turbine hub;
   connecting a root end of said wind turbine blade to said wind turbine hub; and
   removing said first and second lift straps;
   wherein a pitch and level of said wind turbine blade are controlled throughout the process by a single set of controls operatively connected to said motor and said rigging.

* * * * *